United States Patent
Ehlers et al.

(10) Patent No.: US 9,199,740 B2
(45) Date of Patent: Dec. 1, 2015

(54) CABIN ATTENDANT SEAT WITH ADDITIONAL SUPPORT

(71) Applicant: Airbus Operations GmbH, Hamburg (DE)

(72) Inventors: Bernd Ehlers, Hamburg (DE); Mark Herzog, Hamburg (DE); Stefan Behrens, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1 day.

(21) Appl. No.: 14/258,746

(22) Filed: Apr. 22, 2014

(65) Prior Publication Data
US 2014/0326829 A1 Nov. 6, 2014

(30) Foreign Application Priority Data
Apr. 23, 2013 (EP) .................. 13164948

(51) Int. Cl.
*B64D 11/06* (2006.01)
*B64D 11/00* (2006.01)

(52) U.S. Cl.
CPC ............... *B64D 11/06* (2013.01); *B64D 11/00* (2013.01); *B64D 11/0691* (2014.12); *Y02T 50/46* (2013.01)

(58) Field of Classification Search
None
See application file for complete search history.

(56) References Cited

U.S. PATENT DOCUMENTS

| | | | | |
|---|---|---|---|---|
| 4,799,632 A | * | 1/1989 | Baymak et al. | 244/122 R |
| 4,993,666 A | * | 2/1991 | Baymak et al. | 244/122 R |
| 5,133,587 A | * | 7/1992 | Hadden, Jr. | 297/146 |
| 5,335,963 A | * | 8/1994 | Muller et al. | 297/244 |
| 5,383,629 A | * | 1/1995 | Morgan | 244/118.6 |
| 6,302,358 B1 | * | 10/2001 | Emsters et al. | 244/137.1 |
| 6,846,044 B2 | * | 1/2005 | Moffa et al. | 297/452.39 |
| 8,152,101 B2 | * | 4/2012 | Law | 244/118.5 |
| 8,215,695 B2 | * | 7/2012 | Ida et al. | 296/65.03 |
| 8,506,222 B2 | * | 8/2013 | Reid et al. | 411/111 |
| 8,691,037 B2 | * | 4/2014 | Ingram et al. | 156/245 |
| 8,746,315 B2 | * | 6/2014 | Barlag et al. | 156/560 |
| 8,770,659 B2 | * | 7/2014 | Isherwood et al. | 297/14 |
| 2009/0206200 A1 | * | 8/2009 | Bolder et al. | 244/118.5 |
| 2012/0199695 A1 | | 8/2012 | Isherwood et al. | |
| 2013/0126672 A1 | * | 5/2013 | Weitzel et al. | 244/118.6 |

(Continued)

FOREIGN PATENT DOCUMENTS

| | | |
|---|---|---|
| DE | 4125958 | 10/1992 |
| DE | 3790556 | 10/1996 |
| DE | 102008009938 | 9/2009 |

(Continued)

OTHER PUBLICATIONS

European Search Report, Jan. 16, 2014.

*Primary Examiner* — Timothy Collins
*Assistant Examiner* — Medhat Badawi
(74) *Attorney, Agent, or Firm* — Greer, Burns & Crain Ltd.

(57) ABSTRACT

A cabin attendant seat for an aircraft, a seat system comprising such a cabin attendant seat, an aircraft monument comprising such a cabin attendant seat and an aircraft comprising such an aircraft monument. The cabin attendant seat comprises a backrest element and a seat element. The cabin attendant seat is movable from a starting position into at least one end position. The cabin attendant seat further comprises an adapter element, the adapter element being arranged in the cabin attendant seat and configured to connect the cabin attendant seat, in the at least one end position, to an aircraft seat provided in the aircraft.

15 Claims, 7 Drawing Sheets

(56) References Cited

U.S. PATENT DOCUMENTS

| | | | |
|---|---|---|---|
| 2013/0313365 A1* | 11/2013 | Ehlers et al. | 244/118.6 |
| 2014/0027572 A1* | 1/2014 | Ehlers et al. | 244/118.6 |
| 2014/0166808 A1* | 6/2014 | Boenning et al. | 244/118.6 |
| 2014/0232153 A1* | 8/2014 | Bell et al. | 297/232 |
| 2014/0312173 A1* | 10/2014 | Ehlers et al. | 244/118.6 |
| 2014/0321947 A1* | 10/2014 | Speller | 411/511 |
| 2014/0333100 A1* | 11/2014 | Wilkens | 297/163 |

FOREIGN PATENT DOCUMENTS

| | | |
|---|---|---|
| DE | 102011116521 | 4/2013 |
| DE | 102012014619 | 1/2014 |

* cited by examiner

Fig. 3b  DETAIL VIEW. STEWARD STEP

Fig. 3a

CABIN ATTENDANT SEAT WITH ADDITIONAL SUPPORT

CROSS-REFERENCES TO RELATED APPLICATIONS

This application claims the benefit of the European patent application No. 13 164 948.5 filed on Apr. 23, 2013, the entire disclosures of which are incorporated herein by way of reference.

BACKGROUND OF THE INVENTION

The present disclosure relates to a cabin attendant seat for an aircraft, a seat system comprising such a cabin attendant seat, an aircraft monument comprising such a cabin attendant seat and an aircraft comprising such an aircraft monument.

The passenger cabin of a modern aircraft typically is equipped with cabin attendant seats. Such cabin attendant seats are used by the cabin personnel, for example, during takeoff and landing of the aircraft. A conventional cabin attendant seat, as described, for example, in DE 10 2008 009 938 A1, comprises a carrier element which is subdivided into a base element and a backrest element, and a seat element which is fastened to the carrier element and which is constructed as a folding seat element. When the cabin attendant seat is not in use, the seat element is located in a space-saving manner in a folded-up position, that is to say, a seat face of the seat element faces towards a front side of the backrest element of the carrier element. The cabin attendant seat is connected to the aircraft cabin floor by means of the base element of the carrier element.

A further cabin attendant seat is known from DE 3 790 556 C1. The cabin attendant seat comprises not only a seat element which is foldable relative to a carrier element, but also a rotatable backrest element. When these seats are not in use, the backrest element is in such a position that a seat element and a front side of the backrest element face away from the inner space of the passenger cabin. In an operating position of the cabin attendant seat, however, the seat element and the front side of the backrest element are accessible from the inner space of the passenger cabin so that a cabin attendant can be seated on the seat element.

Non-published DE 10 2011 116 521 discloses a cabin attendant seat which is pivotably mounted to an aircraft monument, such that the cabin attendant seat can be pivoted relative to the aircraft monument from a rest position into an operating position. Such cabin attendant seats may also be referred to as swivel cabin attendant seats or swivel-type cabin attendant seats.

Cabin attendant seats may either be mounted to a wall of a monument installed in the aircraft passenger cabin as described in non-published DE 10 2011 116 521 or be attached to the floor of the aircraft passenger cabin as known from DE 10 2008 009 938 A1 (US 2009/0206200 A1).

Further, non-published DE 10 2012 014 619 describes a so-called sliding cabin attendant seat (which may also be referred to as sliding-type cabin attendant seat). The sliding cabin attendant seat as described in DE 10 2012 014 619 comprises a backrest element, a seat element and a guiding apparatus for supporting the flight attendant seat in a starting position. The guiding apparatus is further configured such that the cabin attendant seat is moveable from the starting position into a direction transverse to the longitudinal axis of the backrest element in at least one end position.

Both the swivel and sliding cabin attendant seats can be brought from a start position (rest position) into an end position (operating position). Like normal aircraft seats, also the swivel and sliding cabin attendant seats have to absorb forces, e.g., during taxi, take-off, landing and in-flight turbulences.

Accordingly, there is a need to provide a cabin attendant seat, a seat system having such a cabin attendant seat, an aircraft monument having such a cabin attendant seat and an aircraft having such an aircraft monument, using which the force load applied on the cabin attendant seat can be distributed in a simple way.

SUMMARY OF THE INVENTION

According to a first aspect, a cabin attendant seat for an aircraft is provided. The cabin attendant seat comprises a backrest element and a seat element. The cabin attendant seat is moveable from a starting position into at least one end position. The cabin attendant seat further comprises an adapter element. The adapter element is arranged at the cabin attendant seat and is configured to connect the cabin attendant seat, in the at least one end position, to an aircraft seat provided in the aircraft.

The starting position may also be referred to as start position or initial position. The end position may also be referred to as operating position.

The aircraft seat may be any kind of normal or ordinary aircraft seat usually provided on board the aircraft. The cabin attendant seat and the aircraft seat may be provided at the same position in the aircraft cabin in the longitudinal direction of the aircraft.

The cabin attendant seat may be any kind of swivel (swivel type) cabin attendant seat or sliding (sliding type) cabin attendant seat, which is moveable from the starting position into the at least one end position. The swivel cabin attendant seat may also be referred to as rotatable cabin attendant seat or pivotable cabin attendant seat.

Independent of the exact configuration of the cabin attendant seat, the cabin attendant seat comprises a backrest element and a seat element which may be secured to the backrest element. The seat element may be constructed as a folding seat element. In the folded-up state of the seat element, a seat face of the seat element may abut a front side of the backrest element. In the folded-down state of the seat element, however, the seat element or the seat face of the seat element may extend substantially perpendicular relative to the front side of the backrest element. If the seat element is located in the folded-down state thereof, a cabin attendant can sit on the cabin attendant seat, for example, during take-off and landing of the aircraft.

In case of a swivel type (swivel) cabin attendant seat, the cabin attendant seat may be pivotably mounted to an aircraft monument such that the cabin attendant seat may be pivoted relative to the aircraft monument from a stored position (starting position) into an operating position (end position). In case of a sliding type (sliding) cabin attendant seat, the cabin attendant seat may be slideable from a starting position into the at least one end position.

In case the cabin attendant seat is constructed as a rotatable (swivel) cabin attendant seat, the backrest element, together with the seat element, may be rotatable about an axis of rotation which may extend in a vertical direction when the cabin attendant seat is mounted in an aircraft cabin. By rotation of the backrest element about the rotation axis, the cabin attendant seat can be moved between a rest position and an operating position. When the cabin attendant seat is located in the rest position thereof, the front side of the backrest element may face away from the inner space of the aircraft cabin. However, a rear side of the backrest element may face towards the inner space of the aircraft cabin. When the cabin attendant seat is located in the operating position thereof, however, the front side of the backrest element may be accessible from the inner space of the aircraft cabin so that the seat element can be folded down and the cabin attendant seat can be used. It is conceivable that the backrest element may be rotatable through an angle of approximately 90° about the axis of rotation.

In case of a sliding cabin attendant seat, the cabin attendant seat may comprise a guiding device along which the cabin attendant seat can be moved from the starting position into the at least one end position. For example, the guiding device may comprise a rail system. The rail system may comprise two or more rails. The cabin attendant seat may be moved from the starting position into the at least one end position in a sliding direction which may be transverse to the longitudinal axis of the backrest element. For example, the cabin attendant seat may be moveable from the starting position into the at least one end position in a sliding direction which is perpendicular to the longitudinal axis of the backrest element and perpendicular to the longitudinal axis of the aircraft (perpendicular to the flight direction of the aircraft). Alternatively, the cabin attendant seat may be moveable from the starting position into the at least one end position in a sliding direction which forms an angle with a straight line which is perpendicular to the longitudinal axis of the backrest element and perpendicular to the longitudinal axis of the aircraft. The angle may be a sharp angle between 10 and 45 degrees.

The rail system may comprise or be configured as a linear guiding or a telescopic guiding.

Independent of the exact configuration of the cabin attendant seat, the adapter element may be configured to directly connect the cabin attendant seat to the aircraft seat. For example, the adapter element may have a shape which is adapted to a corresponding recess in the aircraft seat. The adapter element may be configured to connect the cabin attendant seat and the aircraft seat via a form-fit. Form-fit may sometimes also be referred to as form closure, form fit, positive form locking, form lock or positive-locking fit. For example, the adapter element may be inserted into the recess in the aircraft seat such that a form-fit connection is formed between the adapter element and the recess. Different types of connection like a force-fit connection between the adapter element and the corresponding recess may also be conceivable.

The adapter element may be integrated into the frame of the cabin attendant seat. In case of a sliding cabin attendant seat, the guiding device or rail system described above may be connected to said frame. The adapter element may be arranged at an outer perimeter, e.g., an outer circumference, of the cabin attendant seat. For example, the adapter element may protrude from the outer perimeter, e.g., the outer circumference, of the cabin attendant seat. The adapter element may protrude into the moving direction for moving the cabin attendant seat from the starting position into the at least one end position. For example, the adapter element may protrude from the outer perimeter, e.g., the outer circumference, into the direction of the aircraft seat. The outer perimeter, e.g., the outer circumference, may be or comprise the outer perimeter, e.g., the outer circumference, of the frame.

The corresponding recess arranged in the aircraft seat may be the so-called "steward step" which may conventionally be provided in one or more of the aircraft seats provided on board the aircraft for allowing a steward to insert its food. In other words, the steward step may have a size and shape so that a foot of a steward can be inserted. The adapter element may have a size and shape which is adapted to the steward step. For example, the outer perimeter, e.g., the outer circumference, of the adapter element may be adjusted to the inner perimeter, e.g., the inner circumference, of the steward step. In other words, the outer perimeter, e.g., the outer circumference, of the adapter element may at least almost correspond to the inner perimeter, e.g., the inner circumference, of the recess in the aircraft seat.

The cabin attendant seat may comprise a fastening device for fastening the cabin attendant seat to a side wall of an aircraft monument provided on board the aircraft. Alternatively, the cabin attendant seat may be fastened to a side wall of the aircraft monument by means of the guiding device, e.g., the rail system. The aircraft monument may be a galley, a toilet module, a partition wall or another aircraft monument which is typically installed in an aircraft cabin.

In case of a swivel cabin attendant seat being connected to the aircraft monument, the cabin attendant seat may comprise a pivoting mechanism which allows the cabin attendant seat to be pivoted between the rest position (starting position) and the operating position (end position). In its rest position, the cabin attendant seat may be positionable relative to the aircraft monument, such that the seat surface of the seat element faces a wall of the aircraft monument. When the cabin attendant seat is in its operating position, the cabin attendant seat may be positionable relative to the aircraft monument such that the seat surface of the seat element extends substantially perpendicular to the wall of the aircraft monument or substantially perpendicular to the backrest element. When the aircraft attendant seat is in its rest position, the cabin attendant seat requires only a small volume of the cabin space.

The fastening device and the guiding device may be configured and sized, respectively, in such a manner that they are capable of directing away a predetermined maximum force which can be introduced into the cabin attendant seat during operation of the cabin attendant seat via the side wall of the aircraft monument. The maximum force which the fastening device may direct away via the side wall of the aircraft monument may be predetermined by means of corresponding authorization provisions. For example, the maximum force may be a calculated maximum force which acts on the cabin attendant seat in the event of an emergency. For example, it is possible to assume, as a predetermined maximum force, a force which acts on the cabin attendant seat when the cabin attendant seat is subjected to an acceleration of 9G or 16G, respectively.

The configuration of the cabin attendant seat with a fastening device or guiding device allows forces acting on the cabin attendant seat during operation of the cabin attendant seat to be directed away via the side wall of the aircraft monument. Due to the provision of the adapter element and the resulting connection to the aircraft seat, the occurring loads may also be directed to the aircraft seat. Thus, a more equal distribution of the occurring force loads is achieved.

According to a second aspect, a seat system for an aircraft is provided. The seat system comprises a cabin attendant seat as described herein and a plurality of aircraft seats provided in the aircraft. The adapter element of the cabin attendant seat is arranged at or in the cabin attendant seat and is configured to connect the cabin attendant seat to one of the plurality of aircraft seats in the at least one end position of the cabin attendant seat.

The plurality of aircraft seats may be any kind of normal or ordinary aircraft seats. For example, the plurality of aircraft seats may be arranged in a seat row of the aircraft cabin. Just to give some examples, the plurality of aircraft seats may comprise two, three, four, five or more than five aircraft seats arranged in a seat row.

Via the adapter element, the cabin attendant seat may be directly connected to the one of the plurality of aircraft seats. For example, the one of the plurality of aircraft seats may be the aircraft seat next to or closest to the cabin attendant seat. For example, the cabin attendant seat and the one of the plurality of aircraft seats may be separated by an aisle, when the cabin attendant seat is in the starting position. In the starting position of the cabin attendant seat, the cabin attendant seat is, for example, not connected to any one of the plurality of aircraft seats. When being moved into the at least one end position, it is conceivable that the cabin attendant seat is moved into the aisle until it reaches the one of the plurality of aircraft seats and connects to the one of the plurality of aircraft seats via the adapter element. In this way, the cabin attendant seat may be indirectly connected to the further or remaining of the plurality of aircraft seats via the connection to the one of the plurality of aircraft seats, when the cabin attendant seat is in the at least one end position.

As set forth above, the adapter element may have a shape and size being adapted to a corresponding recess, e.g., a steward step, arranged in the one of the plurality of aircraft seats. The adapter element may be arranged at a position in the cabin attendant seat which corresponds to a position of the corresponding recess, e.g., the steward step, arranged in the one of the plurality of aircraft seats. For example, the adapter element and the corresponding recess may be arranged at the same position in the longitudinal direction of the aircraft and/or at the same position in the direction(s) perpendicular to the longitudinal direction of the aircraft.

According to a third aspect, an aircraft monument comprising a wall and a cabin attendant seat as described herein is provided. The cabin attendant seat is attached to the wall of the aircraft monument. The aircraft monument may be galley, a toilet module, a partition wall or another aircraft monument which is typically installed in the aircraft cabin. The cabin attendant seat thus may be installed close to a main aisle of an aircraft cabin in a single aisle aircraft or close to one of the aisles in a twin aisle aircraft which increases visibility of the aisle and passenger seats. The cabin attendant seat may thus provide direct view of almost the entire cabin. The cabin attendant seat may be fastened to the wall of the aircraft monument in a low transmitting manner. Typically, a cabin attendant seat has to fulfill certain load bearing requirements, i.e., the cabin attendant seat must be capable of withstanding certain static and dynamic loads. Therefore, prior art cabin attendant seats usually are provided with a support structure which is mounted to the floor of the aircraft cabin and which is capable of directing loads applied onto the cabin attendant seat into the aircraft structure. When the cabin attendant seat is fastened to the wall of the aircraft monument in a low transmitting manner, the aircraft monument may be used to direct loads applied on the cabin attendant seat into the aircraft structure. In other words, the aircraft monument may serve at least as an additional support structure for the cabin attendant seat allowing the support structure of the cabin attendant seat to be designed less strong and hence lighter in weight.

By connecting the cabin attendant seat to the aircraft seat in the at least one end position, loads applied on the cabin attendant seat can be directed into the aircraft seat and possibly the further aircraft seats. Thus, the light weight can be maintained and the loads can be distributed more equally, when the cabin attendant seat is in the at least one end position. In consequence, an additional support may be provided by means of the adapter element and its connection to the corresponding recess.

As set forth above, in case of a sliding cabin attendant seat, the guiding system like the rail system has to absorb forces, for example when the cabin attendant seat is in the end position. When the cabin attendant seat is connected to the one of the plurality of aircraft seats in the at least one end position, said connection permits a flow of force from the cabin attendant seat to the one aircraft seat and/or the plurality of aircraft seats. This allows the loads applied on the guiding system to be reduced. Further, due to the simple shape of the adapter element which may be adapted to the corresponding recess, a simple connection mechanism is provided. A further locking mechanism is not necessary. In this way, the occurring loads can be reduced and/or distributed by means of a simple and weight saving design.

According to a fourth aspect, an aircraft comprising the aircraft monument as described herein is provided.

BRIEF DESCRIPTION OF THE DRAWINGS

Specific embodiments are now described in greater detail with reference to the appended schematic drawings, in which FIG. 1a schematically illustrates the general concept of a sliding cabin attendant seat in a starting position;

FIG. 2b schematically illustrates a detailed view of the adapter element of the sliding cabin attendant seat of FIG. 2a;

FIG. 3b schematically illustrates a detailed view of the aircraft seat of FIG. 3a;

DETAILED DESCRIPTION OF THE PREFERRED EMBODIMENTS

Although in the following, the present disclosure is described with reference to a sliding cabin attendant seat as one possible example of a cabin attendant seat which is moveable from a starting position to an end position, the skilled person will understand that the present disclosure may be applied also to other cabin attendant seats which are moveable from a starting position to an end position. Just to give one example, the present invention may also be applied to swivel cabin attendant seats.

Figure 1A:
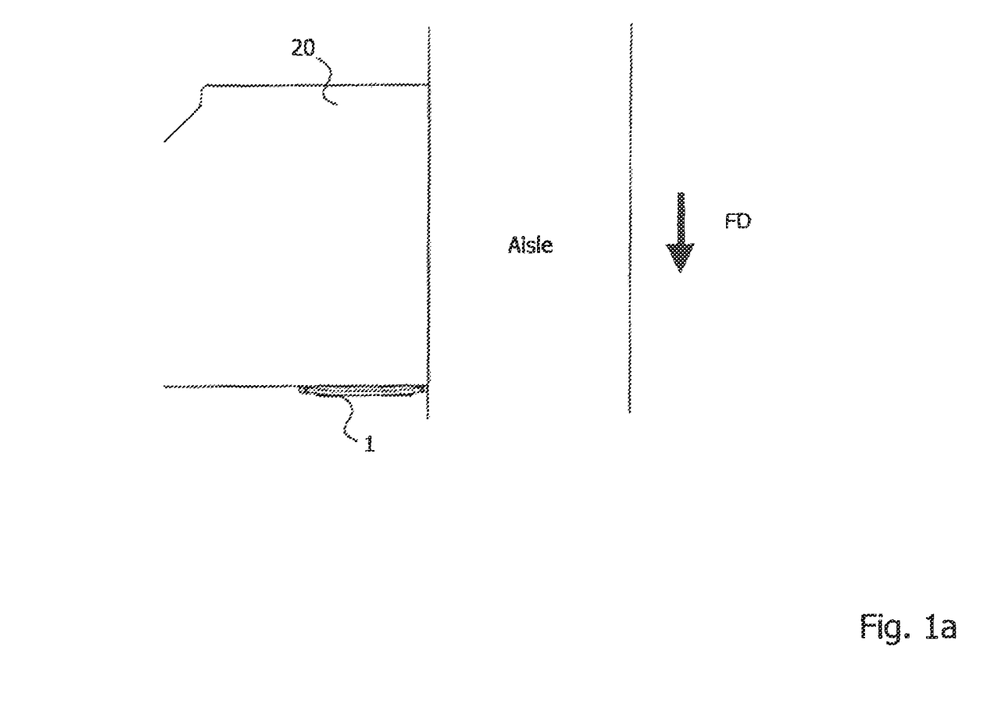
Figure 1B:
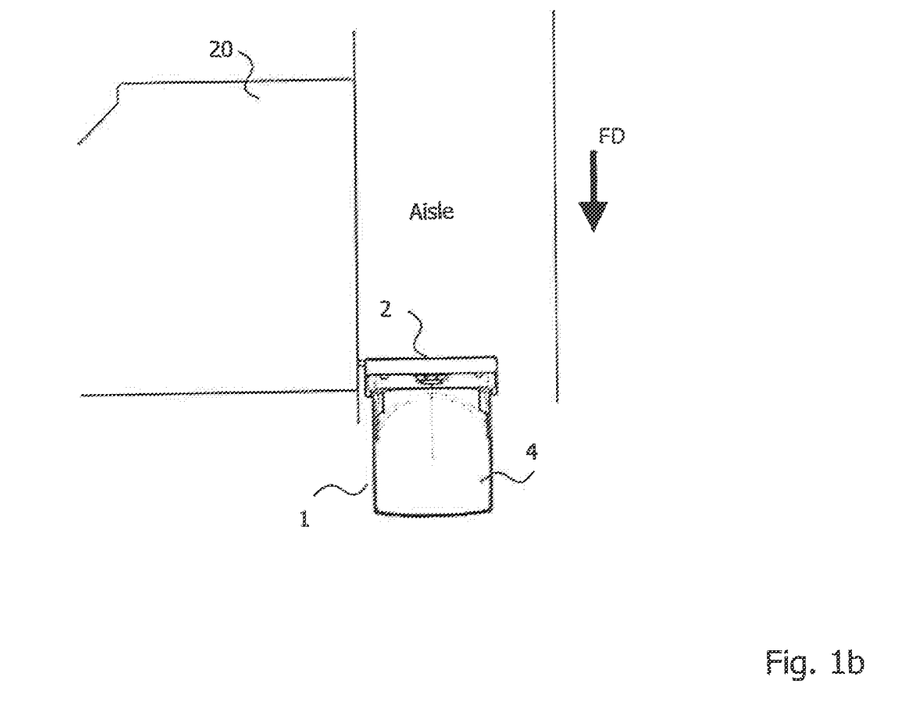
FIG. 1b schematically illustrates the general concept of a sliding cabin attendant seat in an end position.

FIGS. 1a and 1b schematically illustrate the general concept and basic operation of a sliding cabin attendant seat 1. The sliding cabin attendant seat 1 is arranged on or fixed to an aircraft monument 20. In a starting position shown in FIG. 1a, a back rest element 2 and a seat element 4 (both only shown in FIG. 1b) are perpendicular to the flight direction FD of the aircraft. From the starting position, the sliding cabin attendant seat 1 can be moved into a direction perpendicular to the flight direction FD into an end position, as shown in FIG. 1b. In the end position, the sliding cabin attendant seat 1 is positioned in an aisle of the aircraft. Further, in the end position, the seat element 4 can be brought into an opened position in which a cabin attendant can sit on the seat element 4.

Figure 2A:
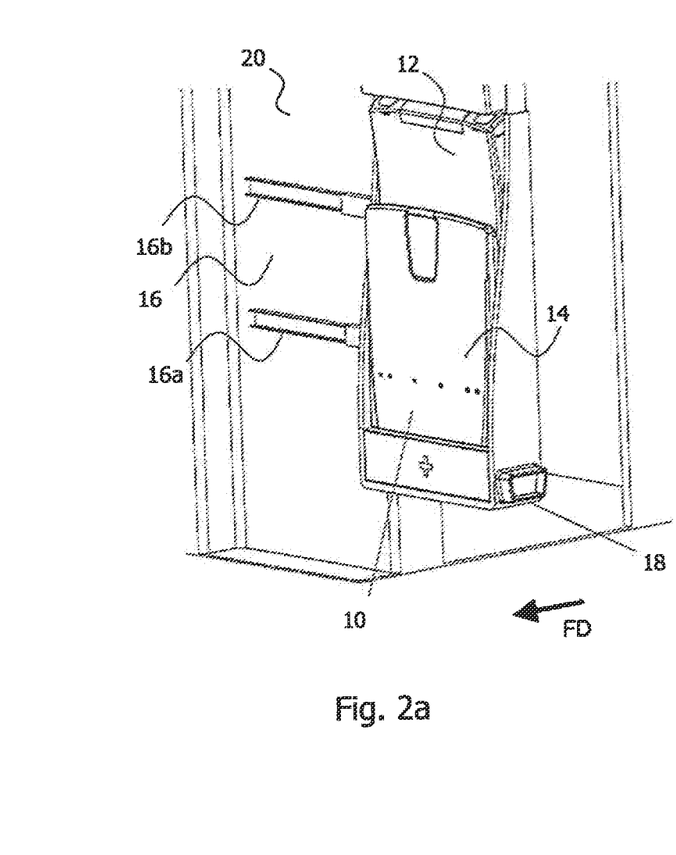
FIG. 2a schematically illustrates an embodiment of a sliding cabin attendant seat in the end position.

In FIG. 2a, a sliding cabin attendant seat 10 according to an embodiment is shown in an end position. The sliding cabin attendant seat comprises a backrest element 12 and a seat element 14. For sliding the cabin attendant seat 10, the sliding cabin attendant seat 10 exemplarily comprises a rail system 16 having a first rail 16a and a second rail 16b. The sliding cabin attendant seat 10 is fixed to an aircraft monument 20 by means of the rail system 16. In the example given in FIG. 2a, the rails 16a, 16b are arranged perpendicular to the flight direction FD of the aircraft. However, the rails 16a, 16b may be arranged in an angle with respect to the direction perpendicular to the flight direction FD. The rail system 16 is arranged such that the sliding cabin attendant seat 10 can be moved from a starting position into an end position (which is shown in FIG. 2a) by sliding the cabin attendant seat 10 along the rails 16a, 16b.

As can be further seen in FIG. 2a, the sliding cabin attendant seat 10 comprises an adapter element 18. In the example shown in FIG. 2a, the adapter element 18 is, by way of example, formed in a shape of a trapezoid (sometimes also named trapezium). Further, the adapter element 18 protrudes from the outer circumference of the sliding cabin attendant seat 10, more particularly, the adapter element 18 protrudes from the outer frame 11 of the sliding cabin attendant seat 10 (see FIG. 2b) in the moving direction for moving the sliding cabin attendant seat from the starting position into the end position.

Figure 2B:
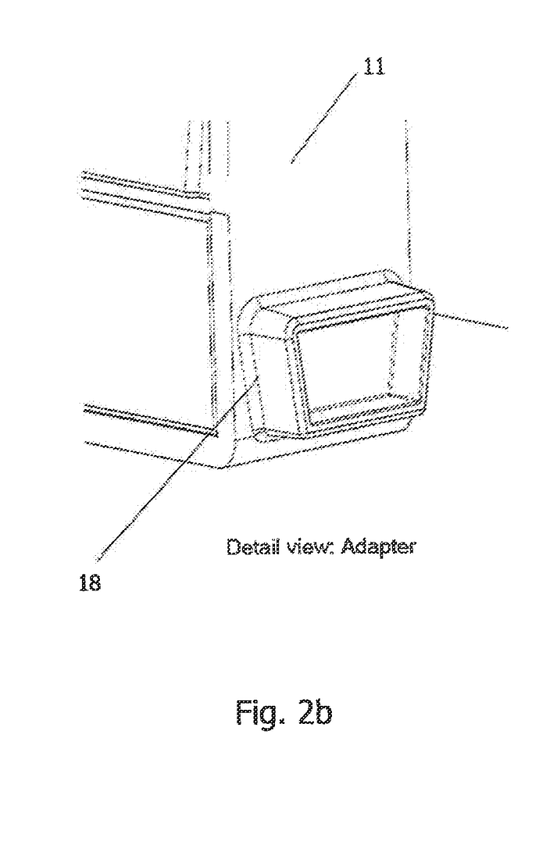
Figure 3A:
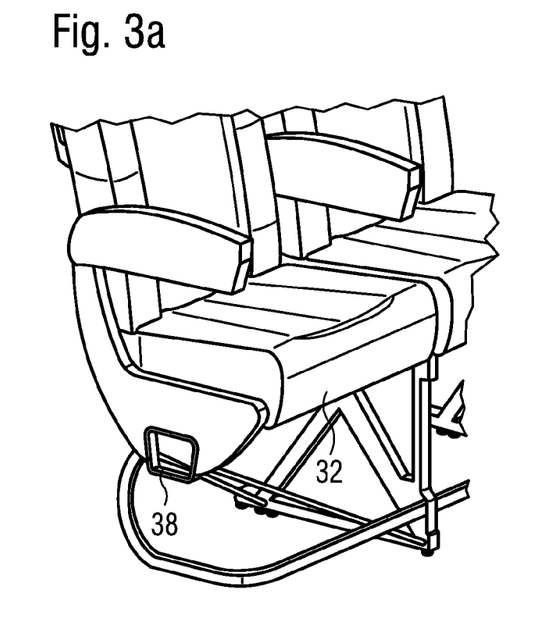
FIG. 3a schematically illustrates an aircraft attendant seat.
Figure 3B:
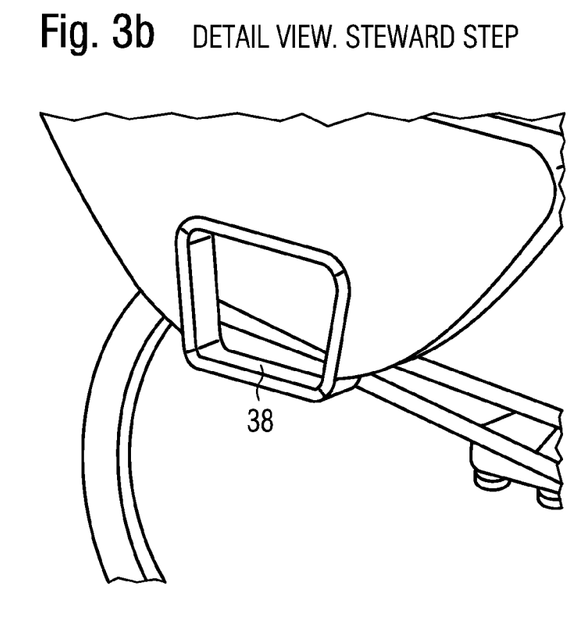

In FIG. 3a, an ordinary aircraft seat 32 typically arranged on board an aircraft is shown. As can be seen in FIGS. 3a and 3b, a recess 38 in the form of a trapezoid is provided in the aircraft seat 32. The recess 38, in the present example, is a so-called steward step, which is typically provided in at least some of the seats provided on board an aircraft, for example, the seats arranged at an aisle of the aircraft. As can be seen in FIGS. 2b and 3b, the form of the adapter element 18 and of the recess 38 are adapted to one another. More particularly, the outer perimeter of the adapter element 18 matches the inner perimeter of the recess 38.

Figures 4A, 4B:
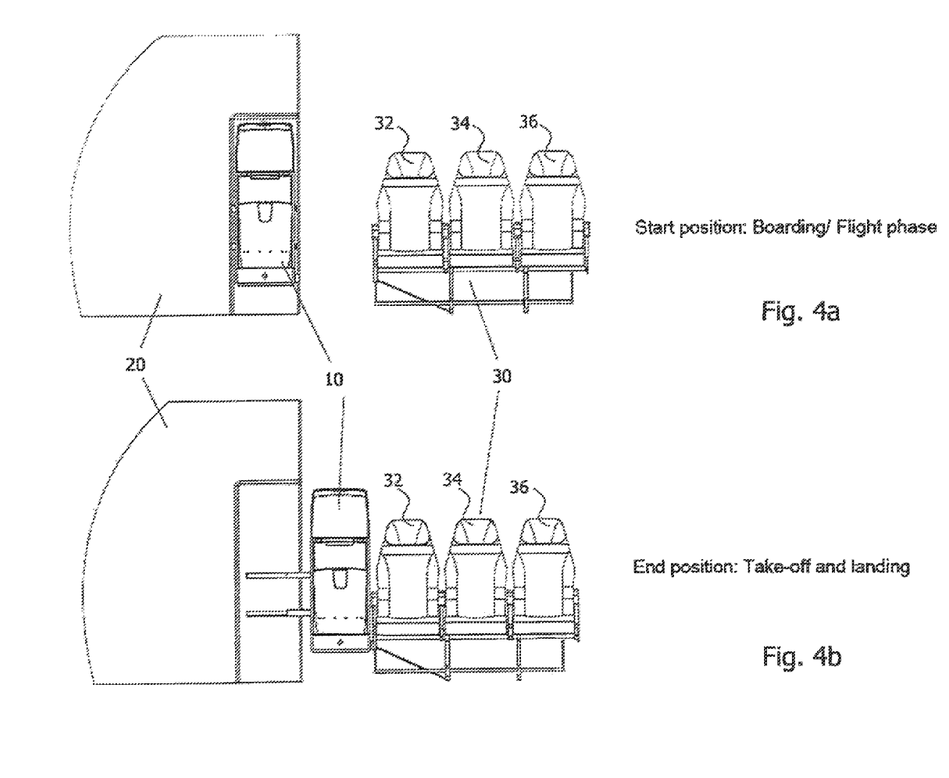
FIG. 4a schematically illustrates the sliding cabin attendant seat of FIG. 2a in its starting position.
FIG. 4b schematically illustrates the sliding cabin attendant seat of FIG. 2a in its end position.

FIGS. 4a and 4b schematically show the sliding cabin attendant seat according to the embodiment of FIG. 2a in a starting position and an end position. As can be seen in FIG. 4a, in the starting position, the sliding cabin attendant seat 10 is only connected to the aircraft monument 20 by means of the rail system 16, but is not connected to any seat 32, 34, 36 of the seat row 30. After the sliding cabin attendant seat 10 has been moved into the end position, it is connected not only to the aircraft monument 20 by means of the rail system 16, but is further connected to the outermost seat 32 (the seat closest to the aisle) of the seat row 30 by means of the adapter element 18.

Figure 5A:
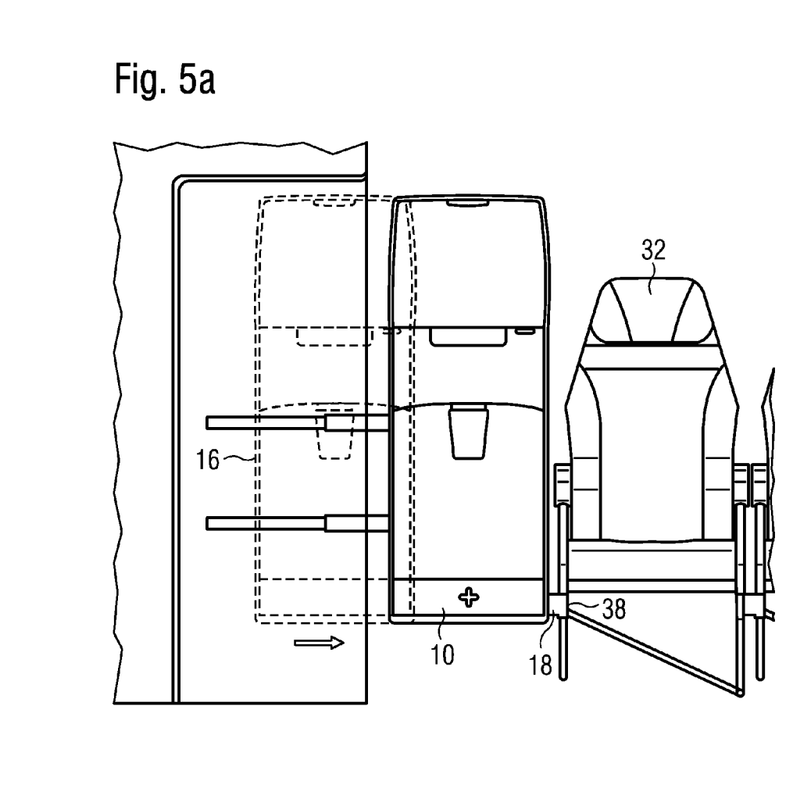
FIG. 5a schematically illustrates the moving direction for moving the cabin attendant seat of FIG. 2a from its starting position into its end position.
Figure 5B:
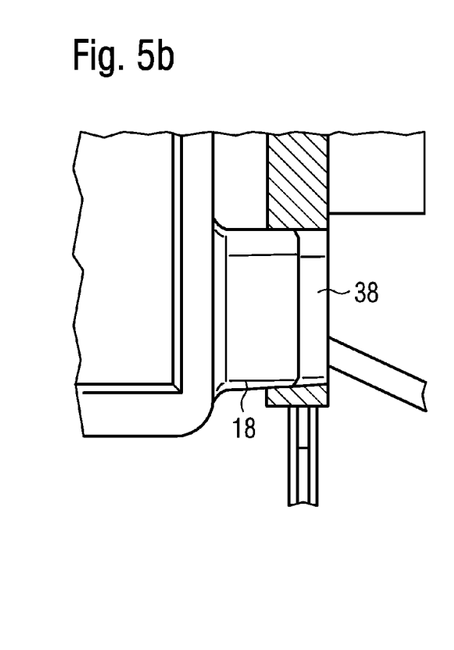
FIG. 5b schematically illustrates a detailed view of the connection between the sliding cabin attendant seat of FIG. 5a with an aircraft seat.
Figure 5C:
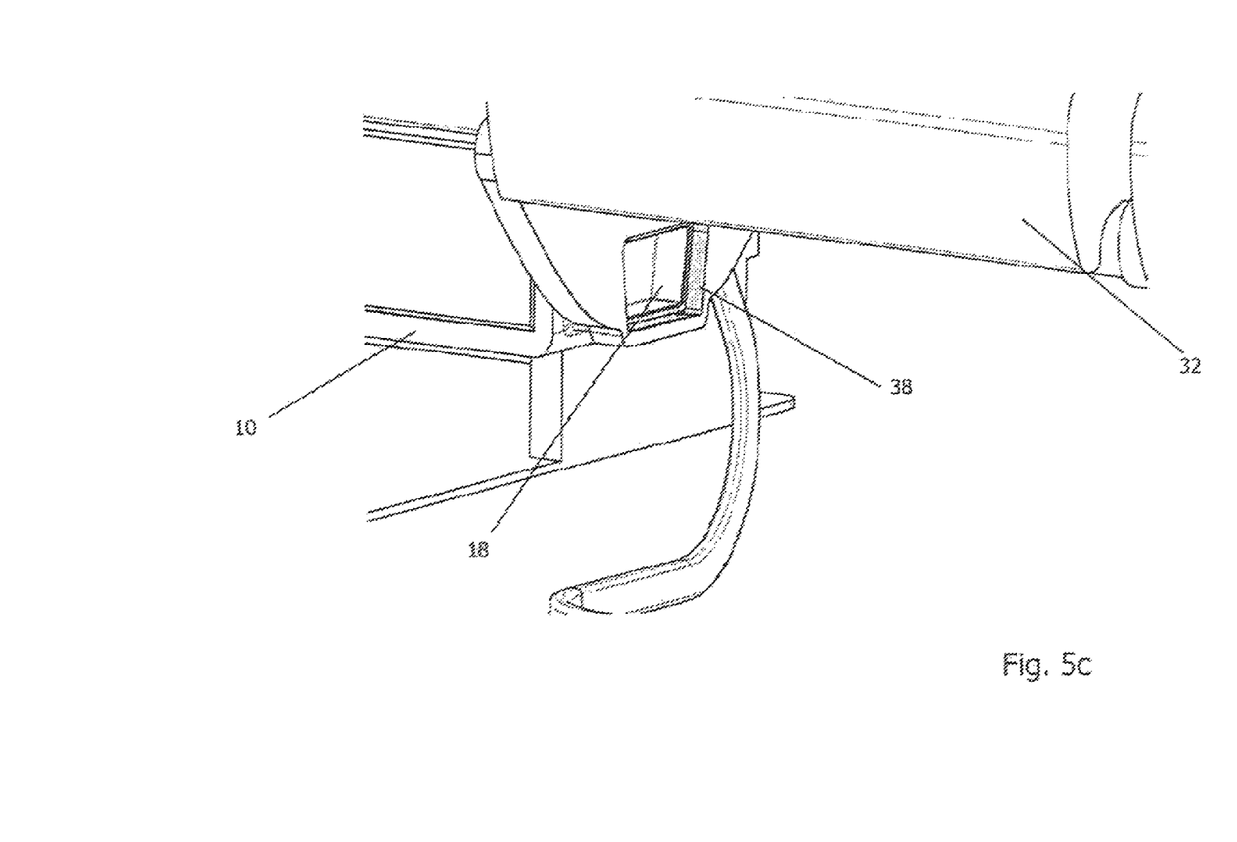
FIG. 5c schematically illustrates a detailed view of the connection between the sliding cabin attendant seat of FIG. 5a with an aircraft seat.

The foregoing can be seen also in FIGS. 5a, 5b and 5c. FIG. 5a schematically illustrates the movement of the sliding cabin attendant seat 10 from the starting position into the end position. In the end position, the adapter element 18 protruding from the outer frame of the sliding cabin attendant seat 10 into the moving direction or into the direction of the aircraft seat 32, is inserted into the recess 38 formed in the aircraft seat 32. As the outer perimeter of the adapter element 18 matches the inner perimeter of the recess 38, a form-fit connection is formed between the adapter element 18 and the recess 38. The form-fit connection is chosen such that force applied to the cabin attendant seat 10 flows over the rail system 16 into the aircraft monument 20 and through the adapter element 18 to the aircraft seat 32 and the further seats 34, 36 of the seat row 30. In this way, the applied load is distributed more equally. By applying a high force in the direction of the starting position, the form-fit connection can be released and the cabin attendant seat 10 can return to its starting position. The foregoing can also be seen in FIG. 5c, in which it is shown that the protruding adapter element 18 is at least partly inserted into the recess 38. By means of the connection between the adapter element 18 and the recess 38, no further locking mechanism is necessary. In this way, the occurring loads can be distributed and the load occurring on the rail system 16 is reduced by means of a simple and weight saving design.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A cabin attendant seat for an aircraft, the cabin attendant seat comprising:
   a backrest element; and
   a seat element;
   wherein the cabin attendant seat is a sliding type cabin attendant seat and is slidable from a starting position into at least one end position in a sliding direction that is perpendicular to a longitudinal direction of the aircraft, and
   wherein the cabin attendant seat further comprises
   an adapter element arranged at the cabin attendant seat that is configured to engage a corresponding coupling element provided in an aircraft seat by sliding in the sliding direction to connect the cabin attendant seat, in the at least one end position, to the aircraft seat provided in the aircraft.

2. The cabin attendant seat according to claim 1, wherein the adapter element is configured to directly connect the cabin attendant seat to the aircraft seat.

3. The cabin attendant seat according to claim 1, wherein the coupling element of the aircraft seat is a recess, and the adapter element protrudes from the attendant seat in the sliding direction and has a shape which is adapted to protrude into the recess in the aircraft seat.

4. The cabin attendant seat according to claim 1, wherein the adapter element is configured to connect the cabin attendant seat and the aircraft seat via a form-fit connection.

5. The cabin attendant seat according to claim 1, wherein the adapter element is at least one of:
   integrated into the frame of the cabin attendant seat;
   and protruding from the outer perimeter of the cabin attendant seat.

6. The cabin attendant seat according to claim 1, wherein the seating position is a storage position, and the end position is an operating position.

7. A seat system for an aircraft, the seat system comprising:
   a plurality of aircraft seats provided in the aircraft and
   a sliding type cabin attendant seat, comprising:
   a backrest element; and
   a seat element;
   wherein the cabin attendant seat is slidable from a starting position into at least one end position in a sliding direction that is perpendicular to a longitudinal direction of the aircraft, wherein the cabin attendant seat further comprises:
an adapter element arranged at the cabin attendant seat and configured to engage a corresponding coupling element provided in one of the plurality of aircraft seats by sliding in the sliding direction to connect the cabin attendant seat, in the at least one end position, to the
one of the plurality of aircraft seats.

8. The seat system according to claim 7, wherein the adapter element is configured to directly connect the cabin attendant seat to the coupling element of the one of the plurality of aircraft seats via the adapter element.

9. The seat system according to claim 8, wherein, in the starting position of the cabin attendant seat, the cabin attendant seat is not connected to any one of the plurality of aircraft seats.

10. The seat system according to claim 7, wherein, in the at least one end position of the cabin attendant seat, the cabin attendant seat is indirectly connected to the further of the plurality of aircraft seats via the connection to the one of the plurality of aircraft seats.

11. The seat system according to claim 7, wherein the coupling element of the aircraft seat is a recess, and wherein the adapter element protrudes from the attendant seat in the sliding direction has a shape which is adapted to protrude into the recess arranged in the one of the plurality of aircraft seats.

12. The seat system according to claim 11, wherein the adapter element is arranged at a position in the cabin attendant seat which corresponds to a position of the recess arranged in the one of the plurality of aircraft seats.

13. The seat system according to claim 7, wherein the plurality of aircraft seats is arranged in a seat row.

14. An aircraft monument comprising,
a wall, and
a sliding type cabin attendant seat attached to the wall of the aircraft monument and comprising:
a backrest element; and
a seat element;
wherein the cabin attendant seat is slidable from a starting position into at least one end position in a sliding direction that is perpendicular to a longitudinal direction of the aircraft, and
wherein the cabin attendant seat further comprises:
an adapter element arranged at the cabin attendant seat and configured to engage a corresponding coupling element provided in an aircraft seat by sliding in the sliding direction to connect the cabin attendant seat, in the at least one end position, to the aircraft seat provided in an aircraft.

15. The aircraft monument of claim 14, wherein the aircraft monument is located in the aircraft.

* * * * *